Oct. 17, 1961  A. PITNER  3,004,322
PROCESSES FOR MANUFACTURING NEEDLE AND LIKE BEARING RACES
Original Filed Dec. 23, 1957
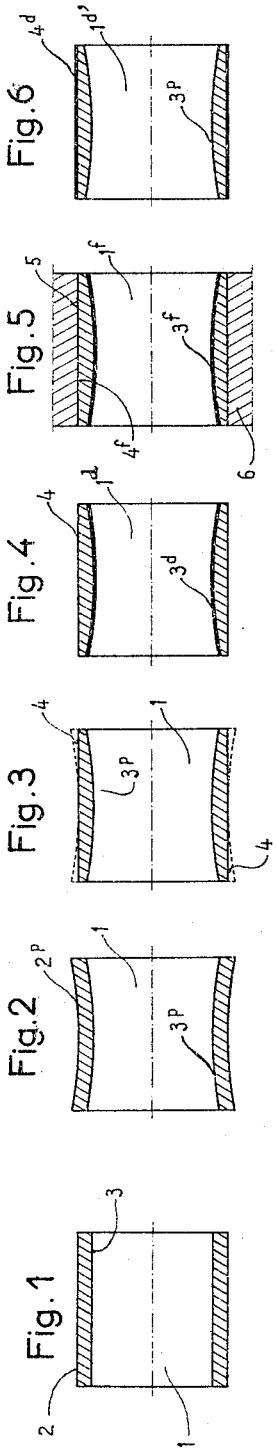
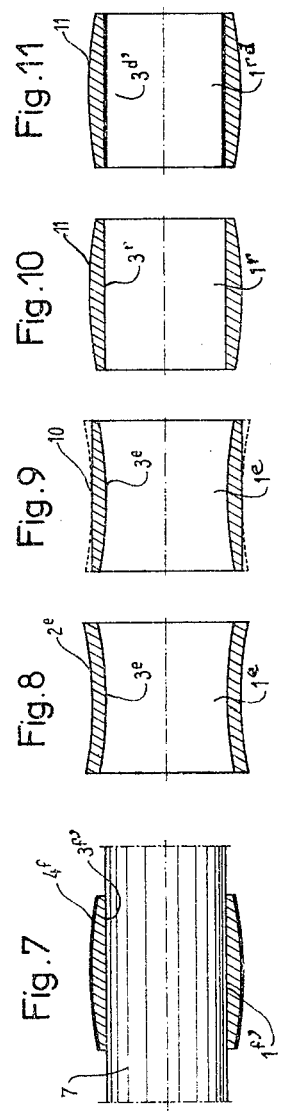
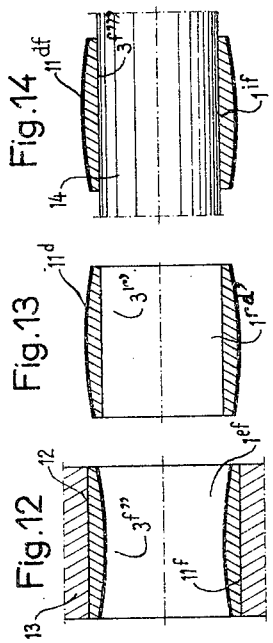
Inventor
Alfred O. Pitner
by Albert L. Ely
Attorney

United States Patent Office 3,004,322
Patented Oct. 17, 1961

3,004,322
PROCESSES FOR MANUFACTURING NEEDLE AND LIKE BEARING RACES
Alfred Pitner, Paris, France, assignor of one-half to Societe Anonyme des Roulements à Aiguilles, Rueil-Malmaison (Seine-et-Oise), France, a corporation of France
Original application Dec. 23, 1957, Ser. No. 704,784. Divided and this application Mar. 25, 1959, Ser. No. 801,849
Claims priority, application France Dec. 28, 1956
5 Claims. (Cl. 29—148.4)

This application is a division of my prior patent application Serial No. 704,784, filed December 23, 1957.

The invention relates to the manufacture of races for needle bearings or like bearings embodying elongated rolling members, where the raceway is convex and the surface opposite the raceway is cylindrical.

The main object of the invention is to devise a process doing away with the machining or trueing of the convex surface of revolution of the raceway, which would require a tool, for example a grinding wheel, of an accurately shaped profile, or a complicated mechanism for imparting to an ordinary tool the trajectory corresponding to the convex profile to be cut or trued.

The process according to the invention consists in deforming a cylindrical tubular blank by curving the generatrices of the inner and outer cylindrical surfaces according to two substantially parallel curves and machining the concave surface of the deformed blank into a cylinder, thus providing a blank the thickness of which varies from one end to the other.

If the deformation above referred to is permanent, the blank with variable thickness thus obtained may be submitted to a hardening treatment, at least over the convex surface, whereas the cylindrical surface serves for mounting the bearing race upon the structural member adapted to receive it.

If the deformation above referred to is an elastic one, when the blank is relieved from the elastic strains, its convex surface resumes the initial cylindrical shape, whereas its opposite surface bulges out into a convex surface of revolution. This process of reversal of the profiles forms the subject-matter of my co-pending patent application Serial No. 704,784 above referred to. In such case, the hardening treatment above referred to is applied to the surface which finally becomes the raceway.

A similar profile reversal process may be applied thereafter to the blank with variable thickness in the free state, as hereinafter described.

In the accompanying drawing, wherein all figures are axial sections, the heavy lines denoting hardened surfaces:

FIG. 1 shows the cylindrical tubular blank;
FIG. 2 shows the blank after deformation;
FIG. 3 shows the blank with variable thickness obtained by removing metal from the concave surface;
FIG. 4 shows the blank after hardening of the convex surface;
FIG. 5 shows the bearing race in place in a structural element;
FIG. 6 shows the blank of FIG. 3 after hardening of the cylindrical surface, before reversal of the profiles;
FIG. 7 shows the same blank after the profile reversal;
FIGS. 8 and 9 are views similar to FIGS. 2 and 3, respectively, showing the first steps of a modified process, in which the deformation of the blank is an elastic one;
FIG. 10 shows the blank with variable thickness of FIG. 9 relieved from the elastic strains, after profile reversal;
FIG. 11 shows the blank of FIG. 10, after hardening of its cylindrical surface, before a further profile reversal;
FIG. 12 shows the same blank after profile reversal;
FIG. 13 shows the blank of FIG. 10, after hardening of its convex surface;
FIG. 14 shows the bearing race mounted upon a shaft.

Referring to the drawing, 1 shows the cylindrical tubular blank, having rectilinear generatrices 2 and 3. Said blank is cold-deformed by means of punches, dies, or the like so as to curve the generatrices 2 and 3 into parallel curves, one $2^p$ being concave, the other one $3^p$ being convex. The degree of deformation and the nature of the metal are so selected that the deformation is a permanent one. The tools are so shaped that the convex surface $3^p$ has a precise calibrated profile.

The blank of FIG. 2 is then machined or lathe-turned so as to remove metal from the concave surface $2^p$, to transform the latter into a cylindrical surface (FIG. 3).

The blank of FIG. 3, of variable thickness, will then be submitted to the following operations:

According to a first modification (FIGS. 4 and 5) it undergoes a hardening treatment, usually limited to the convex surface $3^p$, so as to obtain a convex hardened surface $3^d$. The resulting bearing race is then forced into the bore of the structural element 6 (FIG. 5) adapted to receive it.

According to a modification (FIGS. 6 and 7), the cylindrical surface 4 is adapted to be transformed into a convex raceway, after general hardening of the blank or preferably surface hardening restricted to the convex surface, denoted by $4^d$ after hardening. As described in my co-pending patent application Serial No. 704,784 above referred to, the profile reversal may be obtained either by forcing through the blank a cylindrical mandrel 7 (FIG. 7), so as to obtain a permanent deformation, or by forcing therethrough the cylindrical shaft upon which the race is to be mounted, the shaft being also denoted by 7 in FIG. 7. In this latter case, the deformation may be either permanent or elastic.

If the deformation of the cylindrical tubular blank of FIG. 1 into the curvilinear tubular blank of FIG. 2 is not a permanent one as in FIG. 1, but an elastic one, the blank with variable thickness obtained by machining the concave surface $2^e$ into a cylinder, while the convex surface $3^e$ is left unchanged (FIG. 9) will, once relieved from its elastic strains, resume its initial condition (FIG. 10), i.e. the convex generatrix $3^e$ resumes its rectilinear initial shape $3^r$, while its machined cylindrical face 10 assumes a convex shape, as indicated at 11; in other words, a profile reversal takes place already at this stage.

This blank with variable thickness may be submitted to a general hardening or to hardening of its cylindrical surface, as denoted by $3^{d'}$ in FIG. 11 and then to a further profile reversal by forcing the blank, either into a hollow die if the deformation is to be permanent, or into the bore of a structural element, either one being denoted by 13 in FIG. 12. In this latter case, the deformation may be either permanent or elastic.

Due to the profile reversal produced by forcing the convex surface into a cylindrical bore, the convex surface becomes a cylinder 12, serving as the mounting surface of the race, while the hardened cylindrical surface $3^{d'}$ becomes the convex raceway $3^{t''}$.

However, without any further profile reversal, the blank of FIG. 10 may be hardened, or the convex surface thereof may be hardened, as denoted by $11^d$ (FIG. 13) so as to obtain an outer convex raceway, and the bearing race thus obtained is forced over a shaft 14 (FIG.

14), the cylindrical mounting surface being denoted by 3*t''''* and the raceway by 11*df*.

Hardening of the blank with variable thickness may be carried out by any conventional treatment (heat treatment, carburizing, etc.).

The final mounting of the bearing race into its housing or upon its shaft, as the case may be, can, even without the profile reversal, bring about a certain contraction (FIG. 5) or expansion (FIG. 14) of the race diameter, and this should be taken into account for determining the thickness of the ring before forcing the latter over or into the mechanical element adapted to receive it.

Having now described my invention what I claim as new and desire to secure by Letters Patent is:

1. In a process of manufacturing an unsplit bearing race having a continuous cylindrical mounting surface and a continuous convex raceway adapted to cooperate with elongated rolling elements, the steps comprising starting from an unsplit tubular blank ring having concentric cylindrical surfaces, deforming said blank ring into a solid of revolution having substantially parallel inner and outer faces with curved generatrices and machining the concave face of said deformed blank to transform the latter into a cylindrical surface.

2. In a process as claimed in claim 1, the further step consisting in surface-hardening the machined face of said deformed blank and deforming the latter to transform the convex face of said blank into said mounting surface, whereby said surface-hardened face is transformed into said convex raceway.

3. In a process of manufacturing an unsplit bearing race having a continuous cylindrical mounting surface and a continuous convex raceway adapted to cooperate with elongated rolling elements, the steps comprising starting from an unsplit tubular blank ring having concentric cylindrical surfaces, resiliently deforming said blank ring under temporary stresses into a solid of revolution having substantially parallel inner and outer faces with curved generatrices, machining the concave face of said deformed blank to transform the latter into a cylindrical surface and relieving said blank from said stresses, whereby said machined face becomes convex and the opposite face resumes its initial cylindrical shape.

4. In a process as claimed in claim 3, the further step consisting in surface-hardening the machined face of said deformed blank and re-deforming the latter to transform the convex face of said blank into said mounting surface, whereby said surface-hardened face is transformed into said convex raceway.

5. A process for the manufacture of a bearing having elongated rolling elements and at least one bearing having elongated rolling elements and at least one unsplit bearing race with a continuous convex bearing raceway, comprising deforming a cylindrical cold formed unsplit starting blank by elastic deformation thereof on a mandrel, to impart a concave profile to said blank, removing metal from the outer face of the blank to impart to said outer face a substantially rectilinear profile, whereby to produce from said blank a ring having a varying thickness along a portion thereof adapted to engage the elongated rolling elements, withdrawing said mandrel whereby, upon relief of the elastic deformation, the rectilinear profile of the outer face becomes convex and the convex profile of the inner face becomes substantially rectilinear, subsequently hardening said ring to a desired extent, by heat treatment and tempering thereof on at least that face which is to be used as a bearing raceway, and then force-fitting said ring over a shaft adapted to receive it.

References Cited in the file of this patent
UNITED STATES PATENTS

| | | |
|---|---|---|
| 2,118,317 | Mader | May 24, 1938 |
| 2,189,956 | Kurzina | Feb. 13, 1940 |
| 2,210,132 | Searles | Aug. 6, 1940 |
| 2,259,325 | Robinson | Oct. 14, 1941 |
| 2,383,727 | Lewis | Aug. 28, 1945 |
| 2,540,688 | Novy | Feb. 6, 1951 |
| 2,544,109 | Richardson | Mar. 6, 1951 |
| 2,632,235 | Doyle | Mar. 24, 1953 |
| 2,796,659 | Buske | June 25, 1957 |